Oct. 8, 1957 R. C. DEHMEL 2,808,659
CONTROL LOADING SIMULATING APPARATUS FOR FLIGHT TRAINERS
Original Filed July 8, 1950 2 Sheets-Sheet 2

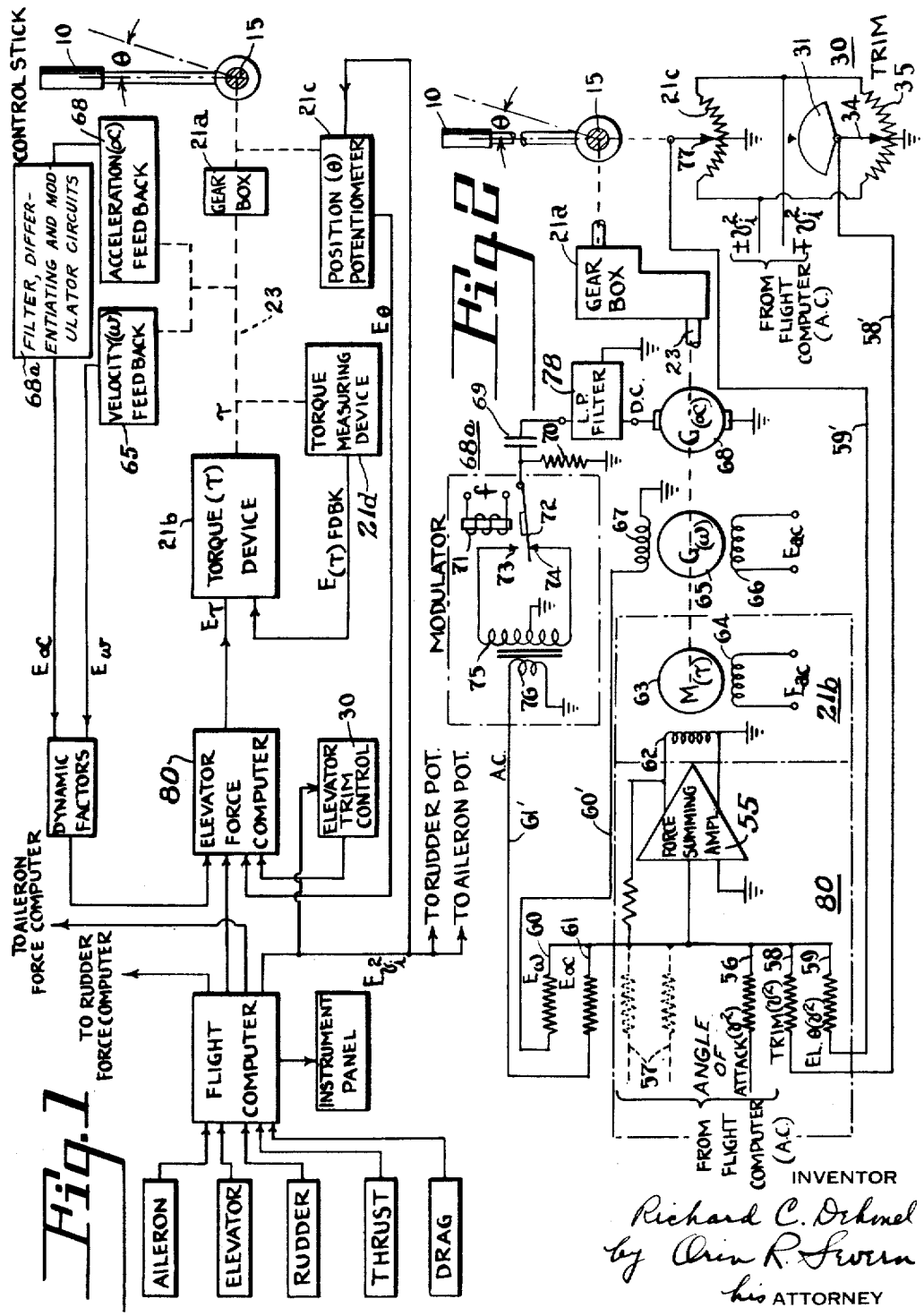

INVENTOR
Richard C. Dehmel
by Orin P. Severn
His ATTORNEY

United States Patent Office 2,808,659
Patented Oct. 8, 1957

2,808,659

CONTROL LOADING SIMULATING APPARATUS FOR FLIGHT TRAINERS

Richard Carl Dehmel, Short Hills, N. J.

Continuation of application Serial No. 172,754, July 8, 1950. This application July 22, 1954, Serial No. 444,967

13 Claims. (Cl. 35—12)

This invention relates to flight training apparatus and particularly to means for realistically simulating aerodynamic forces acting on the controls of aircraft under varying flight conditions.

It has been proposed to apply to the respective simulated aircraft controls of grounded flight trainers forces variable according to the simulated airspeed and the control displacement, one example being a motor-tensioned spring arrangement for opposing the control pressure applied by the student pilot. In this arrangement the spring stress is increased as the airspeed increases, and for any given airspeed the increase in control pressure is relatively linear with control displacement; whereas in practice the control pressure may vary according to a non-linear function which also differs for different airspeeds. The controls so loaded are intended to simulate in operation actual aircraft controls, namely the aileron, elevator and rudder controls which tend to be centered by air resistance at the control surfaces, this resistance being primarily a function of airspeed. In general the prior art devices are complicated and not sufficiently accurate throughout the required range of operation to make realistic the control "feel" for certain types of aircraft, particularly the high-speed aircraft wherein a greater degree of fidelity in control loading simulation is required within a narrow range near the neutral position of the control. That is, in a case of high-speed aircraft the air resistance loading for comparatively small control displacements may be considerable and the normal range of control movement is restricted as compared with low speed aircraft.

The "feel" of the controls therefore during simulated flight maneuvers involving variable factors such as rapidly changing control displacement, varying airspeed and aircraft attitude, becomes an increasingly important feature in pilot training as the rated speed of the aircraft increases.

A principal object therefore of the present invention is to provide for all types of flight trainers improved control loading apparatus that is accurate in simulation of aerodynamic control loading throughout the entire range of control movement and that is simple, direct acting and rugged in construction.

Another object of the invention is to provide improved control loading means including a torque motor that is energized according to computed aerodynamic control loading and directly coupled to the respective control for simulating air resistance acting on said control.

Another object of the invention is to provide improved control loading means including electrical means jointly controlled according to simulated flight conditions and control displacement for energizing an electric torque motor directly connected through reduction gearing to said control.

A further object of the invention is to provide for complete flexibility in control pressure variation, and adaptability for readily changing the scale factor of the control pressure range, as for example in changing from a stick to a wheel control, simulating "boost" off or on, and changing control characteristics, etc., due to change in airplane size and type.

This application is a continuation of my application Serial No. 172,754, filed July 8, 1950, now forfeited, for "Control Loading Simulating Apparatus for Flight Trainers."

The invention will be more fully set forth in the following description referring to the accompanying drawings, and the features of novelty will be pointed out with particularity in the claims annexed to and forming a part of this specification.

Referring to the drawings:

Fig. 1 is a block schematic illustration of components of a control loading system for grounded flight trainers embodying the present invention;

Fig. 2 illustrates diagrammatically an electrical system used in a preferred form of the invention.

Figure 3:
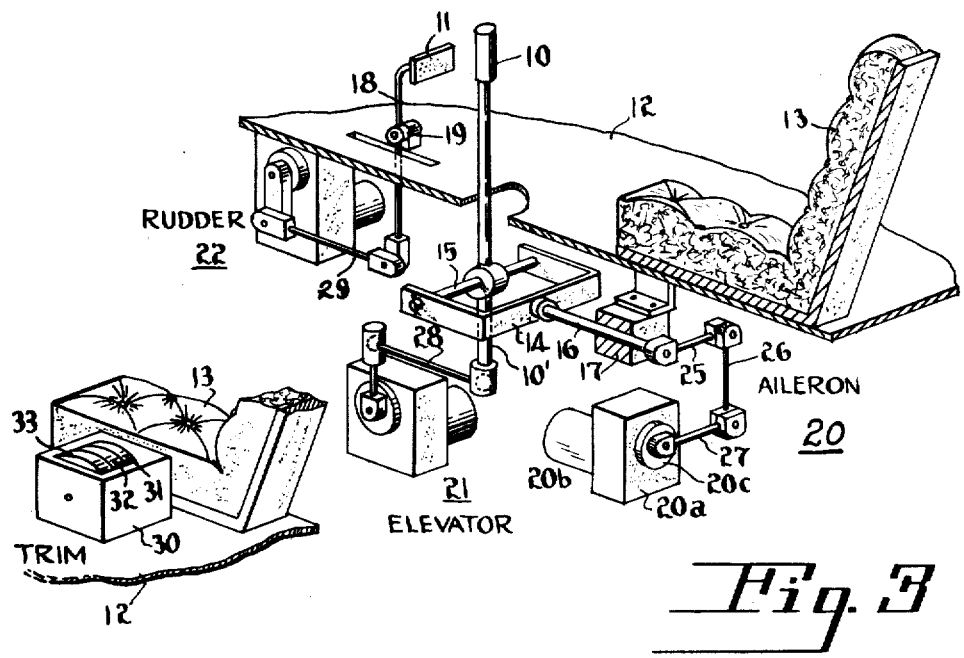
Fig. 3 is a perspective view, partly in section and partly broken away, illustrating a mechanical arrangement of the simulated aircraft controls and control loading apparatus.

In the schematic illustration, Fig. 1, there is indicated flight computing means for producing control quantities such as voltages for use in the control force or load computing system. The flight computing means indicated as the "flight computer" is controlled according to manipulation of the various simulated flight controls by the student pilot, and also according to characteristics of the simulated aircraft, for producing aerodynamic control quantities for control loading purposes and also for operating simulated flight instruments on the trainer instrument panel. The flight computer per se is not a part of the present invention and may for example be of the type disclosed in my copending application S. N. 429,-314, filed May 12, 1954, a continuation of Serial No. 777,414, filed October 2, 1947, now abandoned, for "Flight Computing System and Apparatus." Briefly, the flight computer is of the electronic type and comprises a number of interrelated electric servo systems, each of which is operable to represent a simulated flight condition such as airspeed, rate of pitch, pitch attitude, angle of attack, roll, sideslip, yaw, etc. The servo systems are electrically interconnected so as to respond to control voltages derived from the operation of the respective simulated aircraft controls, namely the aileron, elevator, rudder, throttle, trim, etc., controls, according to the basic equations of flight. Function generators such as potentiometers are adjustable by the respective motor in each servo system for deriving function voltages for flight computing, instrument indication, etc., for example, a potentiometer of the airspeed servo system may be energized by a fixed voltage and adjustable by the airspeed servo motor for deriving a voltage corresponding to the simulated airspeed, or to a function thereof such as the square of airspeed, depending on the potentiometer design. This derived voltage in turn may energize a potentiometer of the angle of attack servo system so that the derived voltage from this potentiometer represents a combined function of both airspeed and angle of attack. By this means, control voltages representing flight condition and aerodynamic factors can be obtained from the flight computer for various purposes such as the control loading computations of the present application.

The control loading system for computing and applying a loading force to the respective flight controls is illustrated by way of example in connection with the elevator stick control 10 located in the pilot's cockpit or station. This control loading arrangement, hereinafter described in more detail is substantially duplicated for the rudder and aileron controls so that a single description thereof is sufficient.

A typical grounded flight trainer station for a student pilot is shown by Fig. 3 wherein simulated stick and rudder controls 10 and 11 are mounted for movement in the usual manner on a supporting base or platform 12. A single rudder control is shown in the interest of simplicity as it will be understood that the rudders are interconnected as in practice. The pilot's seat 13 is also mounted on the base 12 in proper space relation to the simulated controls.

The stick 10 which combines the elevator and aileron control functions in a single control, is mounted in conventional manner for universal movement by means of a yoke 14 which carries a transverse rod 15 on which the stick 10 is rotatably mounted for forward and aft movement, thereby simulating the elevator control. The yoke 14 is in turn integrally connected to a centrally positioned rod 16 that is journaled in a bearing 17 supported by the base 12 so that the stick also is free to rotate transversely in right and left directions thereby simulating aileron control. The rudder 11 is connected to a rod 18 pivotally mounted on the base 12 by means of the bearing 19 for fore and aft rocking movement thereby simulating rudder control.

In accordance with the present invention the force applied to a respective control in simulation of control loading is produced by a torque device directly connected through mechanical or equivalent non-elastic connections to the aforesaid control. As shown in a preferred embodiment of the invention, Figs. 2 and 3, the torque device comprises in the case of each control a torque motor directly connected through suitable torque converter means such as reduction gearing and linkages to the respective control. When the control stick for example is moved by the pilot away from netural, the torque motor is energized by a computed force voltage and produces torque tending to return the stick to neutral. The motor and gearing may be included in single respective units indicated at 20, 21 and 22 for the aileron, elevator and rudder controls respectively. The aileron unit 20 for example, comprises a reduction gear box 20a, a motor-generator set 20b including a torque motor and one or more generators and a position ($\theta$) potentiometer 20c. A crank 25 which is secured to the yoke shaft 16 is connected by means of a link 26 to the crank 27 that is in turn connected to the reduction gearing in the gear box 20a, so that a force can be directly transmitted between the torque motor and the control stick 10 when aileron control is simulated. In order to maintain a substantially linear relationship between the input torque voltage and the torque actually felt at the control, suitable linkage is used such as a parallelogram arrangement illustrated. The torque units 21 and 22 are similar to unit 20 and are suitably connected to the respective elevator and rudder controls such as by means of links 28 and 29.

A simulated trim control 30 is mounted adjacent to the pilot's seat and includes elements 31, 32 and 33 pivoted within the unit for simulating elevator, rudder and aileron trim controls. The trim element 31 for example is operatively connected to a slider contact 34 of a potentiometer 35, Fig. 2, hereinafter described for deriving a voltage corresponding in sense and magnitude to the trim desired.

The factors involved in the energization of the torque device or motor are diagrammatically indicated in Fig. 1 wherein the electrical control quantities are represented as having a solid line input and output connections, and mechanical transmission is represented by dotted lines. Thus, the stick 10, when used for elevator control, is directly connected through the gear box 21a to the torque device 21b. The mechanical output of the torque device 21b can, if desired, operate a suitable torque measuring device 21d for producing a feedback control quantity for the torque device in order to insure linear response of the torque device to its input control quantity. If the characteristics of the torque device are such that the torque output has a linear relation to the control quantity or voltage input, the torque measuring device need not be used.

The torque device is controlled in the present instance by a voltage produced by the elevator force computer 80. As illustrated by Fig. 2, the force computer 80 inputs include factors representing primarily functions of airspeed (from the flight computer), trim, and actual displacement of the control by the pilot (from the position potentiometer 21c shown as mechanically adjustable by the stick), which are modified by secondary dynamic factors which are functions of the velocity (W) and acceleration ($\alpha$) of the output shaft of the torque device indicated by the mechanical connection or shaft 23. The velocity and acceleration feedback devices 65 and 68 are mechanically connected to and driven by the shaft 23 as indicated.

The flight computer also produces control voltages which are functions of airspeed for similarly designed rudder and aileron force computers and also a voltage that is a function of airspeed for the respective elevator, rudder and aileron position potentiometers, the elevator position potentiometer 21c being illustrated as energized by such a voltage.

Referring specifically to Fig. 2, the various inputs for the elevator "force summing amplifier" 55 are indicated as connected through suitable resistances to a common junction point that is in turn connected in well-known manner to the electronic circuits of the summing amplifier. The inputs from the flight computer (as are all inputs to the summing amplifier) are represented as alternating current voltages, depending in phase on the sense of the particular control voltage. The elevator force computer inputs from the flight computer indicated at 56 may for example represent a combined function of the simulated angle of attack and airspeed squared, it being apparent that angle of attack is a pertinent factor for determining in combination with airspeed the air resistance acting on the control surfaces. Where desired, the elevator force computation can be made more precise by including additional inputs indicated at 57 which for example may be functions of Mach number, etc. In general, the factors for computing the elevator loading force include power effect, elevator deflection, angle of attack, pitching velocity, trim tab adjustment, and flaps position. All, or the more important of these factors can be used in the loading force computation depending on the degree of precision required. The rudder factors are primarily side-slip, rudder deflection and trim, and the aileron factors are primarily rate of roll, aileron deflection and trim and angle of attack. Each factor may take the form of a coefficient that is multiplied by a constant and the square of indicated airspeed.

The trim control input at 58 is derived from the trim potentiometer 35, through conductor 58' by means of the manually adjustable slider contact 34. As previously indicated, the pilot positions the trim element 31 so as to simulate desired elevator trim. The trim potentiometer is energized from the flight computer at its opposite terminals by oppositely phased A. C. voltages representing indicated airspeed squared and is grounded at its mid-point so that the voltage derived at contact 34 can vary both in sense and in magnitude for representing positive or negative trim.

The input at 59 from the position ($\theta$) potentiometer 21c is connected by conductor 59' to the slider contact 77 of the $\theta$ or elevator position potentiometer 21c. This potentiometer, as in the case of the trim potentiometer, is energized at its opposite terminals by oppositely phased voltages representing indicated airspeed squared and is grounded at its mid-section so that the derived voltage can be of different sense and varying magnitude to represent positive and negative displacement of the elevator from the neutral position.

The inputs so far described when algebraically summed by the force summing amplifier 55 are sufficient in themselves to define a steady loading force acting on the control stick 10 in opposition to the pilot's control pressure. However, the "feel" of the stick will not be natural, particularly in the case of rapid and extended control movements. The electrical system illustrated in Fig. 2 provides both viscous damping and inertia factors for simulating to a realistic degree the control "feel."

The algebraically summed and amplified output of the force summing amplifier continuously energizes the torque device generally indicated at 21b. Specifically the output energizes the control winding 62 of a two-phase torque motor 63, the secondary winding 64 of the motor being energized from a source of reference A. C. voltage $E_{ac}$. The torque motor 63 is indicated as directly connected through its shaft to the shaft 23 of the gear box, which in turn is directly connected to the control stick. This type of torque motor has a substantially linear relationship between voltage input and torque output within practical operating limits. That is, the loading force applied to the control stick by the torque motor is at all times proportional to the magnitude of the existing motor input voltage, and the direction of said loading force corrsponds to the polarity or sense of said voltage input.

For the purpose of introducing the aforesaid dynamic factors in the computation of the loading force, a pair of generators 65 and 68 are driven directly by the torque motor 63 as indicated for providing velocity and acceleration feedback respectively. The generator 65 is of the alternating current two-phase type having a reference winding 66 energized from a source of reference A. C. voltage $E_{ac}$, and an output winding 67 that is connected through conductor 60' to the amplifier input 60. This input $E_W$ represents velocity feedback and serves to provide a damping factor for the torque servo motor 63. The phase of the generated voltage in the output winding 67 is opposite to that of the control voltages from the flight computer so that the damping force tends to decrease as the generator velocity decreases.

The acceleration feedback means comprises in the present instance a generator 68 of the D. C. type and a resistance-capacitance differentiating network and modulator as indicated. The generator output is fed to a low-pass filter 78 and then to the network and a modulator where it is transformed into alternating current for use in the force summing amplifier. This circuitry is generally indicated at 68a in Figs. 1 and 2. Specifically, the output of the low-pass filter is connected to a time-constant or differentiating circuit comprising a condenser 69 and resistance 70, and the output of this differentiating circuit is connected to the movable contact 72 of a "chopper" as known in the trade comprising a solenoid 71 that is periodically energized according to the reference A. C. frequency for vibrating the movable contact 72 between the contacts 73 and 74. The contacts 73 and 74 are in turn connected to the opposite terminals of a transformer primary winding 75. The transformer secondary winding 76 is connected through conductor 61' to the amplifier input 61 which represents the acceleration feedback $E_a$. The phase of this acceleration voltage is related to that of the flight computer control voltages, so that large inertia forces are in effect matched to those of actual aircraft. The differential circuit including the condenser 69 and resistor 70 is connected to a load impedance sufficiently high so that it has no appreciable loading effect on the output of the differential circuit. This relationship depends on the transformer input reactance at 75 being much higher than the impedance of the resistor 70.

It will now be seen that the mechanical inertia of the system including the motor and generator rotors, shafts, gears, etc., can be compensated as desired by adjusting the output of the acceleration feedback generator 68. For example, when the controls of a small light-weight airplane are being simulated, the inertia effect can be minimized. Corresponding adjustment, such as for increased inertia can be made in the case of simulated controls for heavier planes by reversing polarity of acceleration feedback.

The operation of the system is as follows:

Assuming that the flight computer is operative to produce control force voltages according to indicated airspeed squared and the student pilot has adjusted the trim control 31, Fig. 2, so as to compensate for nose or tail heaviness of the simulated flight, the torque motor 63 is normally positioned at a neutral point corresponding to the trim position, thereby establishing the neutral position of the stick 10. When the stick is in this neutral position, the current in the torque motor control winding 62 is zero (since the flight computer voltages at 56 and 57 are balanced by the trim and stick position voltages at 58 and 59) and the motor 63 is de-energized so that it exerts no torque whatever on the stick. By way of example, suppose that the trim is further adjusted so to move the slider contact 34 toward the right, as shown in Fig. 2. The resulting derived voltage at the input 58 now unbalances the inputs so that a resultant control current flows through the motor winding 62, the phase relationship of the voltage causing the torque motor in this case to exert a force on the stick 10 tending to move it in a counter-clockwise direction. If the stick is unrestrained, it will in assuming a new position of balance actuate the slider contact 77 of the position potentiometer 21c so that the new derived voltage from this potentiometer serves as an "answer" voltage for restoring balance of the force amplifier inputs thereby to de-energize the servo system at the new position of balance.

If now the stick 10 is displaced by the pilot, as for example, to the right in Fig. 2 for a climb, the flight computer voltage at 59 is increased from the position potentiometer 21c, the magnitude of this voltage also depending on the simulated indicated airspeed. As the elevator position changes, the angle of attack of the aircraft also changes, thereby varying the voltage input at 56 for modifying the control loading force according to aerodynamic principles. The amplifier output now tends to operate the torque motor 63 back to the neutral position against the pressure applied to the stick by the pilot, the magnitude of this restoring force being dependent, as will be seen by inspection, upon the simulated airspeed and the amount of displacement, and hence derived voltage from the potentiometer 21c. Thus, if the pilot attempts to hold back the stick 10 through a large angle $\theta$ for a sharp climb at comparatively high simulated airspeed, the combined inputs principally at 58 and 59, are of such magnitude that the resultant force transmitted by the torque motor 63 reaches a very high value.

The same considerations apply not only in the case of a reverse displacement of the stick for a dive, but also in the case of the aileron and rubber controls above referred to. That is, when the control passes through its neutral position, the phase relationship of the position or $\theta$ potentiometer voltages is reversed so that the torque motor 63 again functions to exert a restoring force to the control in opposition to the pilot's pressure. It will therefore be seen that the electrical servo system is sensitive to even small displacements of the control, particularly in the case of high simulated airspeeds, thus providing realistic control "feel" within a comparatively small radius of movement about the neutral position.

If the pilot "horses" the controls, i. e., moves them in a rapid and violent manner, the control "feel" is still retained by reason of the velocity and acceleration voltage generators 65 and 68 which function in the manner previously described for eliminating overshooting or "hunting" and excessive inertia "feel" of the servo system. If, after a displacement of the control, the pilot suddenly lets go, the torque motor 63 returns the stick to neutral at substantially the same speed and with no more "hunting" than in the case of the type of control simulated, this part of the control being due to the velocity voltage generator 65.

Though but a single embodiment of the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. In ground-based flight training apparatus having simulated aircraft controls operable by a student pilot and flight computing means responsive to the operation of said aircraft controls for producing an electrical control signal representing a function of air speed, means for loading a respective aircraft control in simulation of flight conditions comprising means for combining a signal corresponding to displacement of said aircraft control from neutral and said air speed function signal for producing a force control voltage, and motive means responsive to said voltage for transmitting a loading force to said aircraft control opposing the pilot's force tending to move the control from neutral, said motive means being energized continuously during displacement of said control according to the magnitude and sense of the existing force voltage for holding the loading torque on said control.

2. Apparatus for simulating the loading of aircraft flight controls according to aerodynamic forces acting on said controls under different flight conditions comprising means for producing an electrical signal representing a function of air speed, means for combining said air speed function signal and a signal corresponding to displacement of said aircraft control from neutral for in turn producing a force control voltage, and motive means for transmitting loading force to a respective aircraft control opposing the pilot's force tending to move the control from neutral, said motive means being continuously controlled according to the magnitude and sense of said voltage during all displacements of said control from neutral for holding loading torque on said control.

3. In ground-based flight training apparatus having simulated aircraft controls operable by a student pilot and flight computing means responsive to the operation of said aircraft controls for producing an electric control signal representing a function of air speed, means for loading a respective aircraft control in simulation of flight conditions comprising means for combining said air speed function signal and a signal corresponding to displacement of said control for in turn producing a force control voltage, and a torque motor having a rotatable element reversible in direction adapted to be operatively connected to said control through speed reducing means, said torque motor being controlled continuously according to the magnitude and sense of said force control voltage during all displacements of said aircraft control for holding motor torque on said control.

4. In grounded flight training apparatus having simulated aircraft controls operable by a student pilot and flight computing means for producing electrical control quantities responsive to the operation of said aircraft controls, means for loading said controls in simulation of flight conditions, one of the aforesaid electrical quantities representing a function of air speed, means for combining a signal corresponding to the displacement of a respective control, said air speed function signal and other electrical control signals representing aerodynamic conditions produced by said flight computer for in turn producing a resultant electrical signal representing the resultant of aerodynamic forces acting on said control, a torque motor continuously energized during displacement of said control according to the magnitude and sense of said resultant electrical signal, and reversible speed reducing means interconnecting the rotor of said torque motor and said control thereby to establish a direct mechanical non-yielding connection therebetween whereby said motor is adapted to resist displacement of said control from its neutral position in simulation of flight conditions.

5. In grounded flight training apparatus having simulated aircraft controls operable by a student pilot and flight computing means for producing alternating current control voltages representing flight conditions responsive to the operation of said aircraft controls, one of said control voltages representing a function of air speed, means for loading said aircraft controls in simulation of flight conditions comprising means for combining a signal corresponding to the displacement of a respective control, said air speed function voltage and other control voltages representing aerodynamic conditions produced by said flight computing means for in turn producing a resultant alternating current voltage representing the resultant of aerodynamic forces acting on said control, an alternating current two-phase torque motor having one coil energized according to said resultant voltage and the other coil by a reference voltage, and reduction gearing interconnecting the rotor of said torque motor and said aircraft control thereby to establish a direct mechanical non-yielding connection therebetween whereby said motor is adapted to resist displacement of said control from its neutral position in simulation of flight conditions.

6. In grounded flight training apparatus having simulated aircraft controls operable by a student pilot and flight computing means for producing control quantities responsive to the operation of said aircraft controls, means for loading said controls in simulation of flight conditions comprising means energized by one of said control quantities representing a function of airspeed and variable by movement of a respective control for deriving a force control quantity which varies in response to the movement of said respective control, said force quantity representing joint effects of control displacement and simulated airspeed, means jointly responsive to said force control quantity and to other control quantities representing other aerodynamic factors produced by said flight computing means for producing a resultant control quantity representing the resultant of aerodynamic forces acting on said control, and a torque motor having a rotatable element connected including reduction gearing and energized according to said resultant control quantity for directly resisting displacement of said control from its neutral position.

7. In grounded flight training apparatus having simulated aircraft controls operable by a student pilot and flight computing means for producing control voltages representing flight conditions responsive to the operation of said aircraft controls, means for loading said controls in simulation of flight conditions comprising means energized by one of said control voltages representing a function of airspeed and variable by movement of a respective control for deriving a force control voltage which varies in response to the operation of said respective control to represent joint effects of control displacement and simulated airspeed, means jointly responsive to said force control voltage and to other control voltages representing other aerodynamic factors produced by said flight computing means for producing a resultant force control voltage representing the resultant of aerodynamic forces acting on said control, and a torque motor having a rotatable element connected to said control, said torque motor being continuously energized according to said resultant voltage for resisting displacement of said control from its neutral position, the loading force applied by said torque motor being at all times proportional to the magnitude of the existing resultant force voltage, and the direction of said force corresponding to the polarity or sense of said voltage.

8. In grounded flight training apparatus having simulated aircraft controls operable by a student pilot and flight computing means for producing control voltages representing flight conditions responsive to the operation of said aircraft controls, means for loading said controls in simulation of flight conditions comprising means energized by one of said control voltages representing a function of airspeed and variable by movement of a respective control for deriving a force control voltage which varies in response to the operation of said respective control to represent joint effects of control displacement and simulated airspeed, means jointly responsive to said force control voltage and to other control voltages representing other aerodynamic factors produced by said flight computing means for producing a resultant force control voltage representing the resultant of aerodynamic forces acting on said control, and an electric torque motor having a rotatable element connected to said control through a direct mechanical drive including reduction gearing, said torque motor being continuously energized according to said resultant voltage for resisting displacement of said control from its neutral position.

9. In grounded flight-training apparatus having simulated aircraft controls operable by a student pilot and flight computing means for producing control quantities responsive to the operation of said aircraft controls, means for loading said controls in simulation of flight conditions comprising means energized by one of said control quantities representing a function of airspeed and variable by movement of a respective control for deriving a force control quantity which varies in response to the movement of said respective control, said force quantity representing joint effects of control displacement and simulated airspeed, means jointly responsive to said force control quantity and to other control quantities representing other aerodynamic factors produced by said flight computing means for producing a resultant control quantity representing the resultant of aerodynamic forces acting on said control, simulated trim control means for producing a bias control quantity for modifying said resultant quantity, and a torque motor having a rotatable element connected to said control through a non-elastic connection including reduction gearing and energized according to said modified resultant control quantity for directly resisting displacement of said control from its neutral trimmed position.

10. In grounded flight training apparatus having simulated aircraft controls operable by a student pilot and flight computing means for producing control voltages representing flight conditions responsive to the operation of said aircraft controls, means for loading said controls in simulation of flight conditions comprising function generating means energized by one of said control voltages representing a function of airspeed and variable by movement of a respective control for deriving a force control voltage which varies in response to the operation of said respective control to represent joint effects of the control displacement and simulated airspeed, computing means jointly responsive to said force control voltage and to other control voltages representing other aerodynamic factors produced by said flight computing means for producing a resultant force control voltage representing the resultant of aerodynamic forces acting on said respective control, simulated trim control function generating means energized according to said airspeed voltage and adjustable for deriving a trim bias voltage, said bias voltage modifying the effect of said resultant voltage, and a torque motor having a rotatable element connected to said respective control, said torque motor being continually energized according to the modified resultant voltage for resisting displacement of said respective control from its neutral trimmed position.

11. In grounded flight training apparatus having simulated aircraft controls operable by a student pilot and flight computing means for producing alternating current control voltages representing flight conditions responsive to the operation of said aircraft controls, means for loading said controls in simulation of flight conditions comprising potentiometer means energized by one of said control voltages representing a function of airspeed and variable by movement of a respective control for deriving a force control voltage which varies in response to the operation of said respective control, said force voltage representing joint effects of control displacement and simulated airspeed, a summing amplifier jointly responsive to said force control voltage and to other control voltages representing other aerodynamic factors produced by said flight computing means for producing a resultant A. C. control voltage representing the resultant of aerodynamic forces acting on said control, and an electric torque motor having a rotatable element directly connected through reduction gearing to said control, said torque motor being energized according to said resultant voltage for resisting displacement of said control from its neutral position.

12. In grounded flight training apparatus having simulated aircraft controls operable by a student pilot and flight computing means for producing alternating current control voltages representing flight conditions responsive to the operation of said aircraft controls, means for loading said controls in simulation of flight conditions comprising a potentiometer energized at its opposite terminals by one of said control voltages representing a function of airspeed and variable by movement of a respective control for deriving a force control voltage which varies in response to the movement of said respective control, said force voltage representing joint effects of control displacement and simulated airspeed, a summing amplifier jointly responsive to said force voltage and to other control voltages representing other aerodynamic factors produced by said flight computing means according to the respective control simulated for producing a resultant A. C. control voltage representing the resultant of aerodynamic forces acting on said control, and an electric torque motor of the two-phase, alternating current type, one winding of said motor being energized according to said resultant control voltage and the other winding according to a reference A. C. voltage the rotor of said motor being connected to said control for resisting displacement of said control from its neutral position.

13. In ground-based flight training apparatus having simulated aircraft controls operable by a student pilot and flight representing means for producing a control signal representing a function of airspeed, means for loading said controls to simulate aerodynamic flight conditions comprising motive power means operatively connected to a respective control for varying in accordance with varying flight conditions opposition to the force applied by the pilot tending to displace the control from a neutral position, means for producing a control signal according to said control displacement, and means for combining the control signals representing respectively a function of airspeed and aircraft control displacement for producing a resultant electrical force control signal, said motive power means being continuously energized during all control displacements from said neutral position according to said resultant electrical force signal for applying the loading force to the respective simulated aircraft control.

References Cited in the file of this patent

UNITED STATES PATENTS

| | | |
|---|---|---|
| 2,485,292 | Kail | Oct. 18, 1949 |
| 2,519,233 | Davis et al. | Aug. 15, 1950 |
| 2,522,434 | Dehmel | Sept. 12, 1950 |

UNITED STATES PATENT OFFICE

CERTIFICATE OF CORRECTION

Patent No. 2,808,659                            October 8, 1957

Richard Carl Dehmel

It is hereby certified that error appears in the printed specification of the above numbered patent requiring correction and that the said Letters Patent should read as corrected below.

Column 3, line 34, for "netural" read -- neutral --; column 8, line 42, before "including" insert -- to said control through a non-elastic connection --; column 9, line 61, for "continually" read -- continuously --.

Signed and sealed this 19th day of November 1957.

(SEAL)
Attest:
KARL H. AXLINE
Attesting Officer

ROBERT C. WATSON
Commissioner of Patents